(12) United States Patent
Bement et al.

(10) Patent No.: US 6,961,209 B2
(45) Date of Patent: Nov. 1, 2005

(54) DISC STABILIZATION SYSTEM

(75) Inventors: Gary Edwin Bement, Frederick, CO (US); Michael David Mundt, Longmont, CO (US); Paul Smith, Niwot, CO (US); Mark Andrew Chapin, Louisville, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 151 days.

(21) Appl. No.: 10/647,190

(22) Filed: Aug. 21, 2003

(65) Prior Publication Data

US 2005/0041331 A1   Feb. 24, 2005

(51) Int. Cl.[7] .......................... G11B 33/14; G11B 5/60
(52) U.S. Cl. ................................................ 360/97.02
(58) Field of Search ........................ 360/97.01, 97.02, 360/97.03, 98.01

(56) References Cited

U.S. PATENT DOCUMENTS

| | | | | |
|---|---|---|---|---|
| 5,134,530 | A * | 7/1992 | Hall ........................ | 360/97.03 |
| 5,257,151 | A | 10/1993 | Cooper et al. ........... | 360/98.07 |
| 6,091,570 | A * | 7/2000 | Hendriks ................. | 360/97.03 |
| 6,381,101 | B1 * | 4/2002 | Mohajerani et al. ..... | 360/254.7 |
| 6,449,119 | B1 * | 9/2002 | Hashizume et al. ..... | 360/97.03 |
| 6,542,328 | B2 | 4/2003 | Harrison et al. ......... | 360/97.03 |
| 6,549,365 | B1 * | 4/2003 | Severson ................. | 360/97.02 |
| 6,762,908 | B2 * | 7/2004 | Long et al. .............. | 360/97.02 |
| 6,788,493 | B1 * | 9/2004 | Subramaniam et al. .. | 360/97.02 |
| 6,882,501 | B2 * | 4/2005 | Machcha et al. ........ | 360/97.03 |
| 2002/0003681 | A1 * | 1/2002 | Takegawa ................... | 360/244 |
| 2002/0015255 | A1 * | 2/2002 | Tadepalli et al. ........ | 360/97.02 |
| 2002/0181148 | A1 | 12/2002 | Dahlenburg et al. ..... | 360/97.02 |
| 2003/0072103 | A1 | 4/2003 | Kang et al. .............. | 360/97.02 |
| 2003/0099060 | A1 | 5/2003 | Kang et al. .............. | 360/97.02 |
| 2003/0179491 | A1 * | 9/2003 | Yoo ........................ | 360/97.01 |
| 2003/0193752 | A1 * | 10/2003 | Takahashi et al. ....... | 360/245.3 |

FOREIGN PATENT DOCUMENTS

JP   57-117166 A   *  7/1982

* cited by examiner

Primary Examiner—Jefferson Evans
(74) Attorney, Agent, or Firm—Westman, Champlin & Kelly

(57) ABSTRACT

A disc stabilization system comprises a spinning disc with a disc surface deflectable by shock. The disc surface is in contact with a gas layer adjacent the disc surface. When the suspension system is subjected to a mechanical shock, the disc can deflect. The amplitude and duration of the deflection due to mechanical shock is limited by a wing feature. The wing feature includes an aerodynamic surface that interacts with the gas layer to generate an aerodynamic force on the disc surface. A strut supports the wing feature over the disc surface in a position such that the aerodynamic force increases as the disc surface deflects toward the aerodynamic surface.

22 Claims, 6 Drawing Sheets

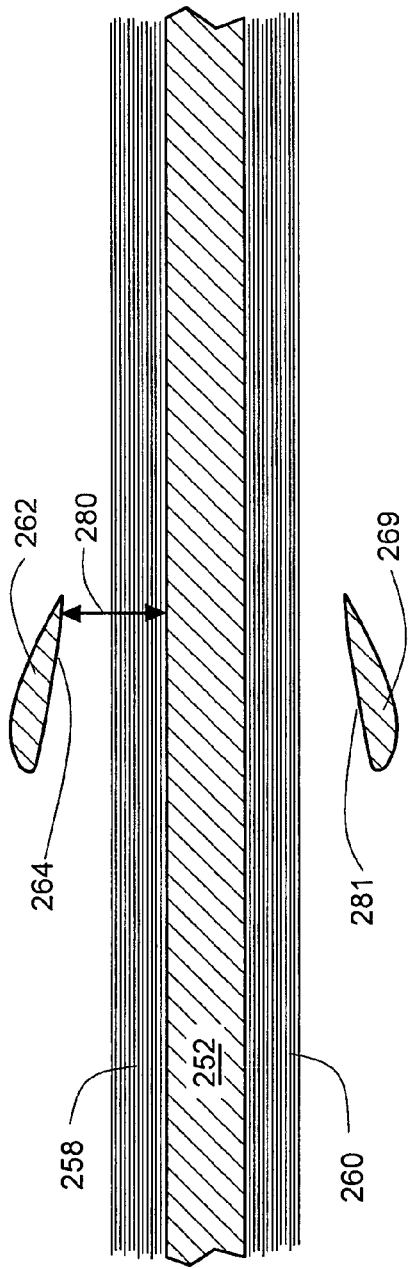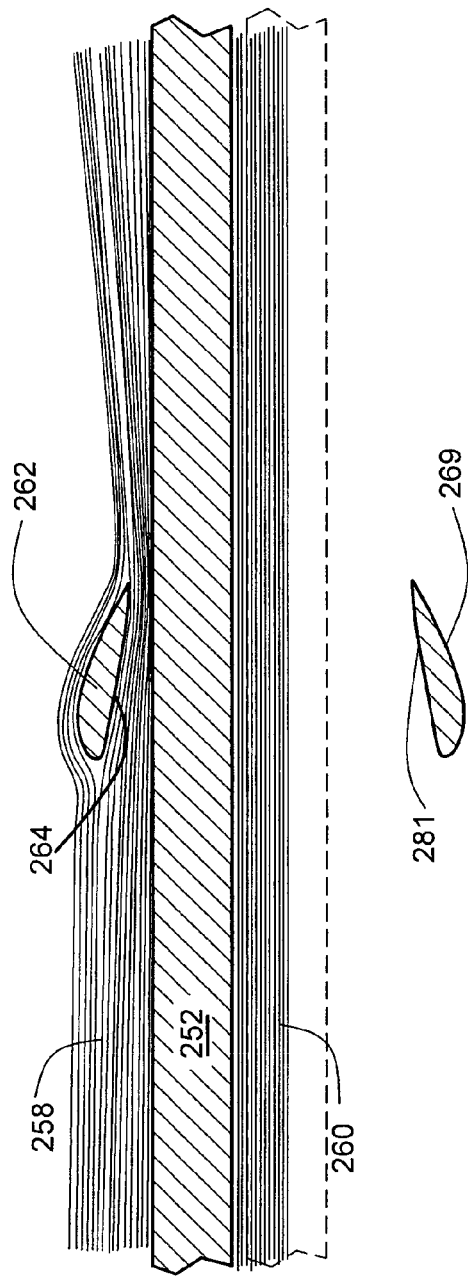

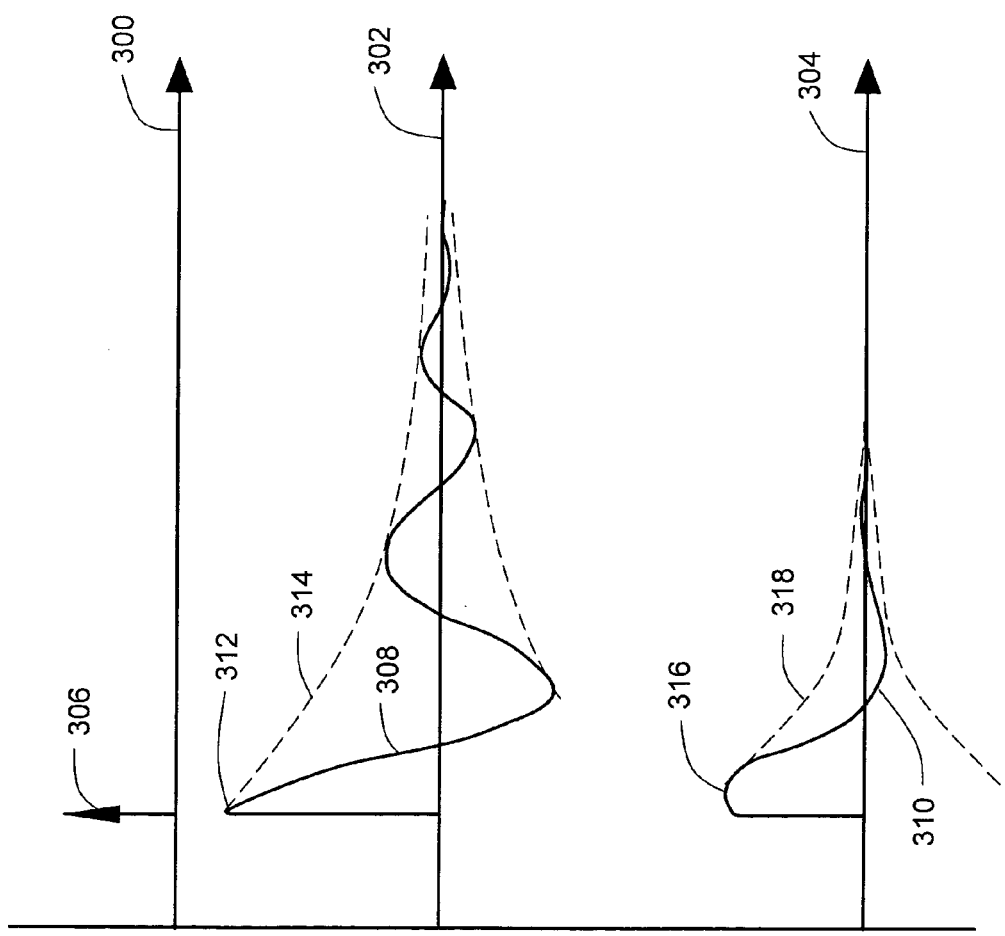

DISC STABILIZATION SYSTEM

FIELD OF THE INVENTION

The present invention relates generally to stabilization of spinning discs, and more particularly but not by limitation to stabilization of discs in disc drives.

BACKGROUND OF THE INVENTION

In disc drives, there is a need to maintain a fly height spacing between a disc and an air bearing surface of a head in a desired range. When the disc is flat and there is no externally applied shock, then the aerodynamic force generated at the air bearing surface and a preload force combine to provide the desired fly height spacing. When the disc drive is subjected to shock, however, then the disc can be deflected so that the fly height spacing changes, and the head can also be deflected so that the fly height spacing changes. If the deflections of the disc and the head are slow enough and small enough, then the naturally stabilizing interaction of the aerodynamic force and the preload force can maintain the fly height spacing in a desired range. If the deflections are too large or too fast, then the fly height spacing will exceed the desired range and the disc drive will malfunction. The problem is compounded by the fact that the preload force is transferred to the disc and tends to cause a small deflection of the disc under the head. Closed loop electronic fly height control systems are known, however, in some cases the shock is too large or too fast for adequate compensation by a fly height control system. Methods and apparatus are needed to improve the control of fly height, particularly in small form-factor disc drives.

Embodiments of the present invention provide solutions to these and other problems, and offer other advantages over the prior art.

SUMMARY OF THE INVENTION

Disclosed are a method of stabilization and a disc stabilization system. The disc stabilization system comprises a spinning disc that has a disc surface that is deflectable by a shock or vibration. The disc surface is in contact with a gas layer adjacent the disc surface. When the stabilization system is subjected to a mechanical shock or vibration, the disc can deflect. The amplitude and duration of the deflection due to mechanical shock or vibration is limited by a wing feature.

The wing feature includes an aerodynamic surface that interacts with the gas layer to generate an aerodynamic force on the disc surface. A strut supports the wing feature over the disc surface in a position such that the aerodynamic force increases as the disc surface deflects toward the aerodynamic surface.

Other features and benefits that characterize embodiments of the present invention will be apparent upon reading the following detailed description and review of the associated drawings.

BRIEF DESCRIPTION OF THE DRAWINGS

FIG. 4 illustrates a side cross-sectional view of a disc stabilization system at a quiescent condition.

FIG. 5 illustrates a cross-sectional view of a disc stabilization system during a shock.

FIG. 7 illustrates a timing diagram of disc motion responsive to a shock.

DETAILED DESCRIPTION OF ILLUSTRATIVE EMBODIMENTS

In the embodiments described below, disc stabilization systems use wing features (also called pumping features) that are strategically positioned so that an aerodynamic surface of the wing feature interacts with a disc surface to provide a stabilization force to the disc. In one application, the stabilization system is used to stabilize spacing between a disc and a read/write head to reduce operational variation of head/disc spacing. The arrangement is particularly useful in small form-factor disc drives. Examples of disc stabilization systems are described below in connection with FIGS. 1–7.

Figure 1:
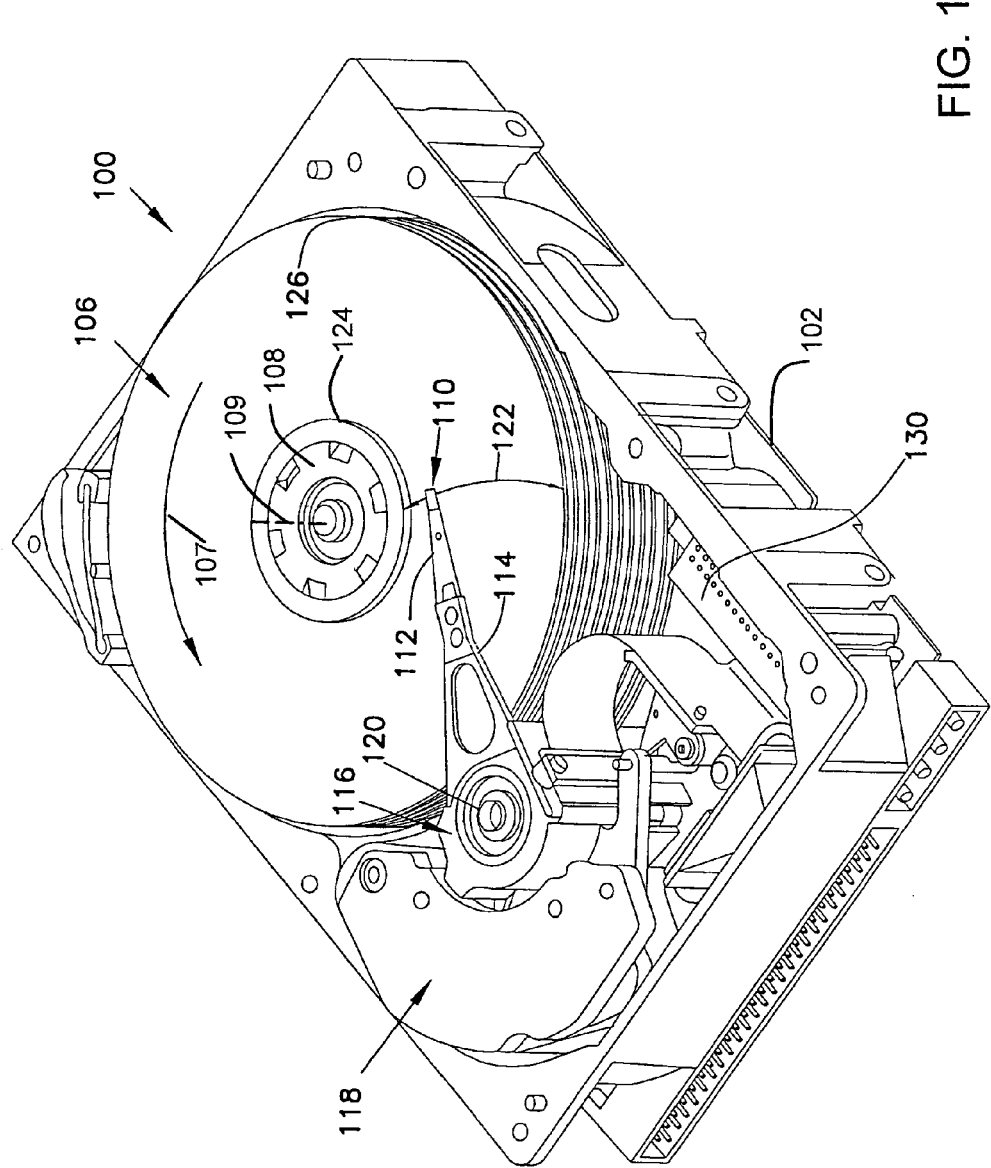
FIG. 1 illustrates an oblique view of a disc drive.

FIG. 1 illustrates an oblique view of a disc drive 100 in which embodiments of the present invention are useful for stabilizing discs. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation in a direction indicated by arrow 107 about central axis 109. Each disc surface has an associated disc read/write head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached read/write heads 110 about a pivot shaft 120 to position read/write heads 110 over a desired data track along an arcuate path 122 between a disc inner diameter 124 and a disc outer diameter 126. Voice coil motor 118 is driven by electronics 130 based on signals generated by read/write heads 110 and a host computer (not shown). The disc drive 100 also includes wing features (not visible in FIG. 1) that stabilize each of the discs in the disc pack 106.

In disc drives, the rotating disc causes airflow in the drive to get channeled under an air bearing surface located on a read/write head. The airflow and a spring suspension force on the read/write head are designed to maintain a constant spacing between the read/write head and the magnetic disc under quiescent conditions. In the present arrangements, airflow is channeled through wing features to apply force to various areas of the disc where needed, thus effectively increasing the disc stiffness. Under conditions of shock and vibration (non-quiescent conditions) the added stiffness reduces deflection of the disc and helps to maintain a constant spacing between the read/write head and the disc. In newer designs, fewer discs are used on a per-drive basis because of increasing areal density on each disc. The reduced number of discs provides more space between the discs and this space is used for positioning the present wing features and associated support struts. These wing features can also be used in one-disc hard drives. The wing features apply force to the disc to increase stiffness and thus reduce disc vibration velocity and amplitude caused by different shock or vibration mechanisms.

Figure 2:
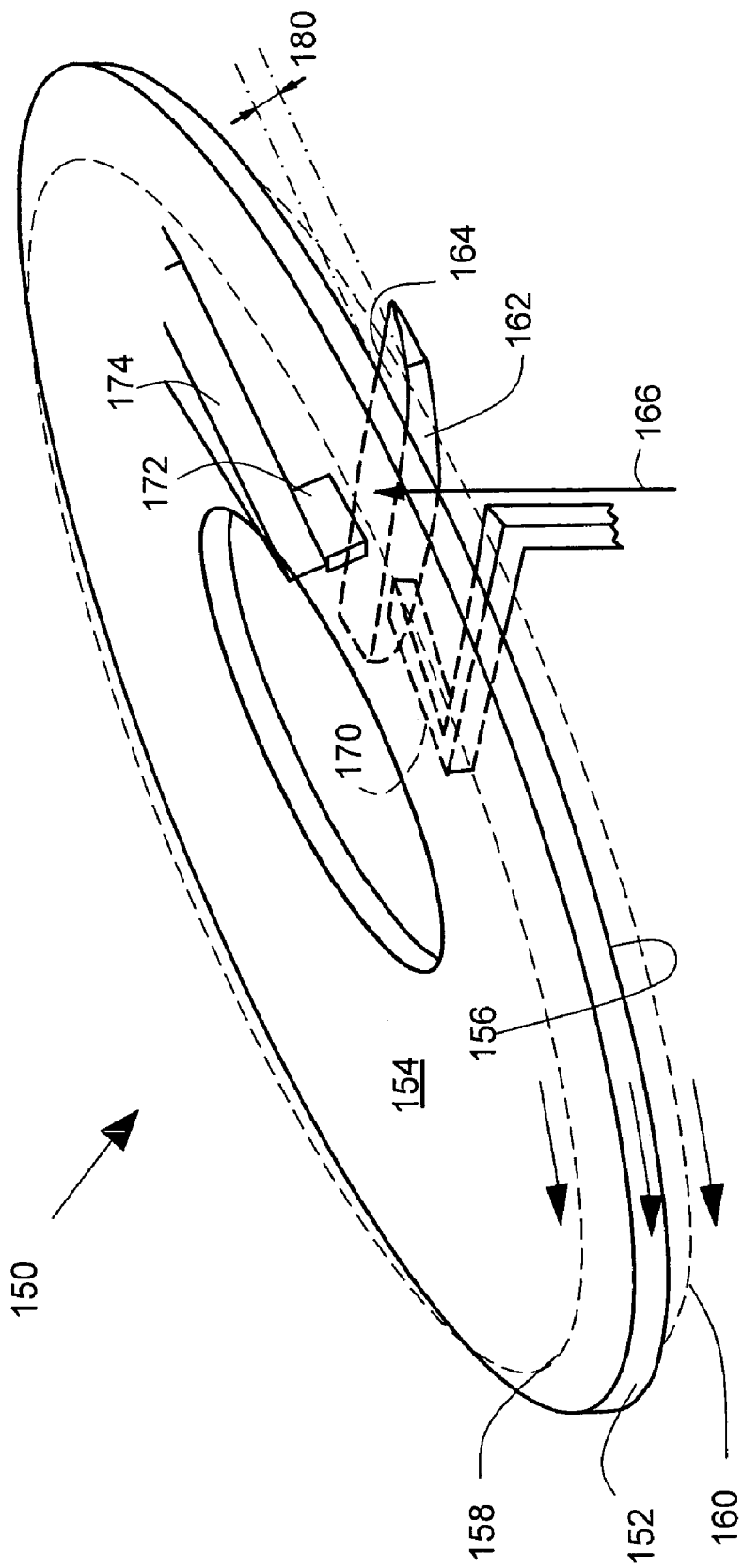
FIG. 2 illustrates an oblique view of a first embodiment of a disc stabilization system.

In the case of thin discs (e.g., 0.010" and 0.015" thick micro-drive discs), the preload force of the read/write head suspension can cause the disc to deform. This deformation can cause undesirable and non-constant fly height loss due to disc coning. Because of the variability of the fly-height loss, the read/write head needs to fly at a higher nominal fly height so that fly height loss due to disc deflection does not cause a head crash. For drives that use only one disc surface, a wing feature opposite the head can counteract the preload force on the head and eliminates excessive disc deflection (as illustrated in FIG. 2). Complexity of the wing shape depends on the complexity of the force imbalance due to suspension, and the wing can be shaped to apply more force at the outer diameter than at the inner diameter. The shapes of wing features can be initially determined using commercially available computer flow modeling programs, verified by testing of physical models, and scaled to the desired magnitude based on the model test data. In a preferred arrangement, the wing feature is shaped to provide a desired aerodynamic force (ground effect force) on the disc.

Figure 3:
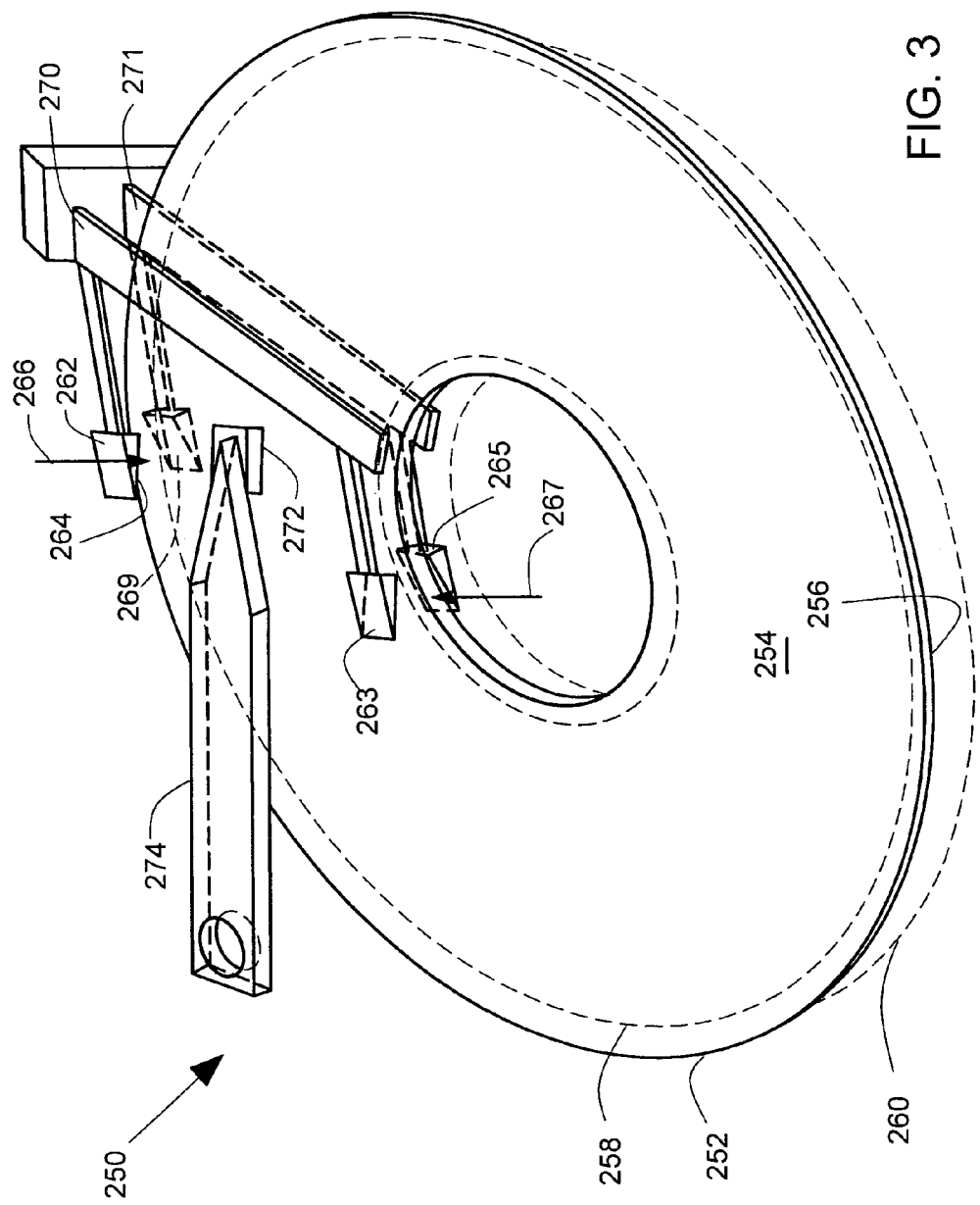
FIG. 3 illustrates an oblique view of a second embodiment of a disc stabilization system.
Figure 6:
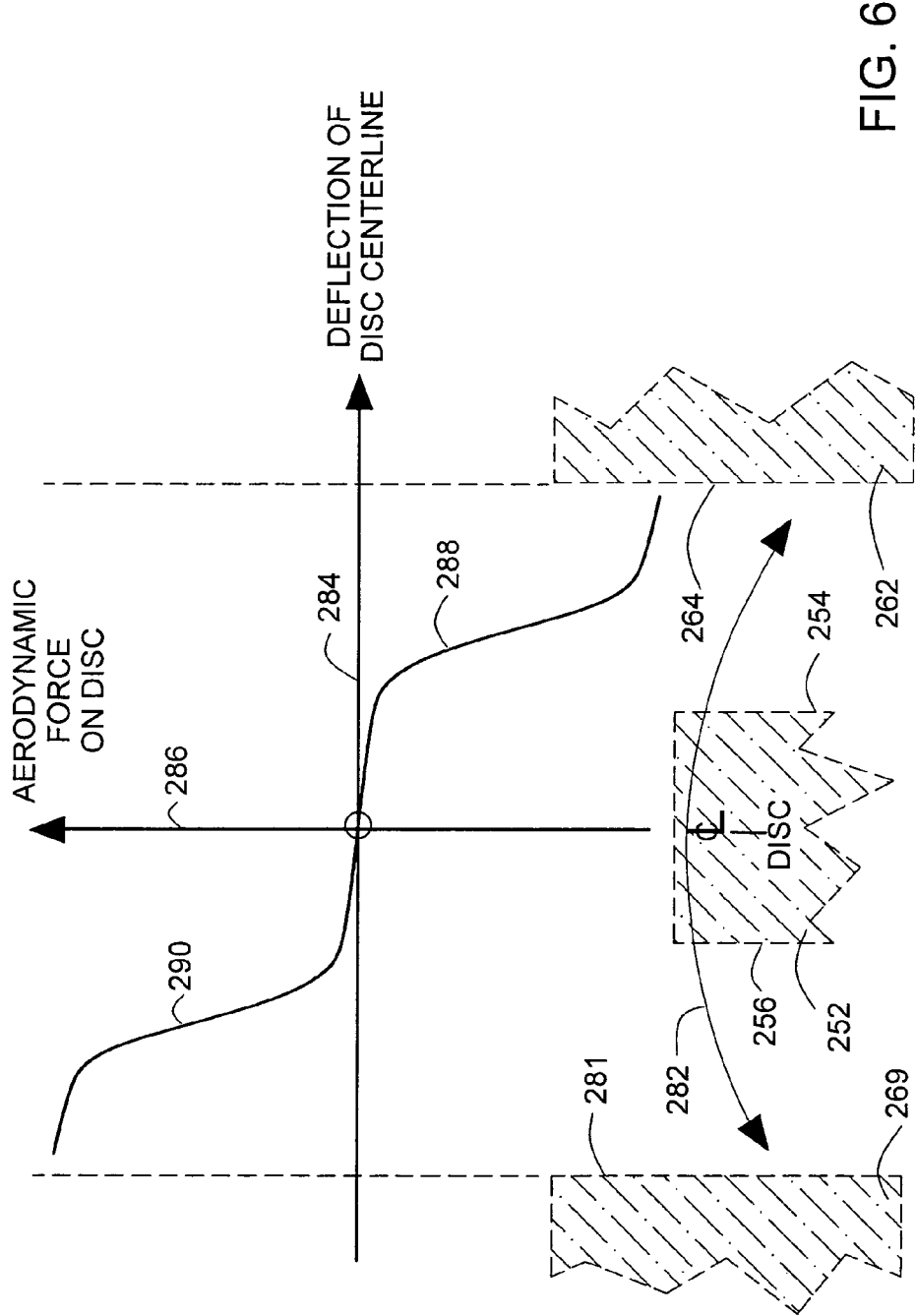
FIG. 6 illustrates aerodynamic force on a disc as a function of displacement of the disc.

In a situation where the disc is deformed due to operational shock or disc clamping, multiple smaller wing features can be used to reduce the deformation. In this situation, wing features on opposing sides of the disc can be used to keep the disc centered. Since the pump force is non-linear with spacing (as illustrated in FIG. 6), multiple wing features can be used to compress the flow near the disc and generate the desired aerodynamic forces which vary as a function of disc deflection. The closer the disc is to one of the wing features, the more force the wing feature applies to the disc, which will cause the disc to move back into a centered position. Two pairs of wing features can be used, one set near the inner diameter and one set near the outer diameter (as illustrated in FIG. 3).

Wing features can also be used to apply force to the head during operational shock. By design, the drive can have an "idle" radius at which the heads dwell when the drive is operating but is not reading, writing, or seeking. The drive spends a majority of its "power-on" time not performing any operations, so the likelihood of an operational shock to occur is the greatest at this radius. Thus, the drive could be designed to have this radius aligned with one of the previously-described wing features to reduce the amplitude of head separation during operational shock (as illustrated in FIG. 7).

When a disc is running in its quiescent position, the wing features can be spaced far enough back from disc surfaces to avoid excessive power consumption due to drag on the discs from the wing features. Examples of a wing feature (also called pump feature) is described in more detail below in connection with an example illustrated in FIG. 2.

FIG. 2 illustrates an oblique view of a first embodiment of a disc stabilization system 150. The disc stabilization system 150 comprises a spinning disc 152 that has a top disc surfaces 154 and a bottom disc surface 156 that are deflectable by shock or vibration. The disc surfaces 154, 156 are in contact with gas layers 158, 160 (also called aerodynamic boundary layers) adjacent the disc surfaces 154, 156. The spinning disc surfaces drive the adjacent gas layers 158, 160 to spin along with the disc 152.

A read/write head 172 glides over the disc surface 154 for reading and writing data on the disc surface 154. The read/write head 172 is positioned by a suspension 174. When the stabilization system 150 is subjected to a mechanical shock, the disc 152 can deflect, causing the spacing between the read/write head 172 and the disc surface 154 to change, resulting in a head crash or loss of data. The amplitude and duration of the deflection due to mechanical shock is limited by a wing feature 162 such that head crashes and loss of data are reduced.

The wing feature 162 includes an aerodynamic surface 164 that generally faces the disc surface 156 and that has an aerodynamic interaction with the gas layer 160 that is proximate thereto. The interaction generates an aerodynamic force 166 on the disc surface 156. The force 166 is a component perpendicular to the disc surface 156. A strut 170 rigidly supports the wing feature 162 over the disc surface 156 in a position such that the aerodynamic force 166 increases as the disc surface 156 deflects toward the aerodynamic surface 164. The strut 170 is shaped to avoid contacting the spinning disc 152 and rigidly supports the aerodynamic surface 164. The strut 170 couples between the wing feature 162 and a mechanical grounding point such as a disc drive housing. The strut 170 is less deflectable by the shock and vibration than the disc surface 156. When the disc 152 is deflected by shock or vibration, the disc 152 moves relative to the aerodynamic surface 164, changing a spacing 180.

The aerodynamic force 166, which varies non-linearly as a function of the spacing 180 between the disc surface 156 and the aerodynamic surface 164, tends to stabilize the position of the disc 152. The deflection of the disc 152 is effectively damped and limited by the aerodynamic force 166. The dynamic mechanical response of the stabilized disc 152 to shock and vibration is comparable to a disc with a larger stiffness or more mass, but without the stabilization. Multiple wing features (also called pumping features) can be arranged in other configurations, as well, as described below in connection with an example illustrated in FIG. 3.

FIG. 3 illustrates an oblique view of a second embodiment of a disc stabilization system 250. The disc stabilization system 250 comprises a spinning disc 252 that has disc surfaces 254, 256 that are deflectable by shock or vibration. The disc surfaces 254, 256 are in contact with gas layers 258, 260 adjacent the disc surfaces 254, 256 respectively. The spinning disc surfaces 254, 256 drive the adjacent gas layers 258, 260 to spin along with the disc 252.

A read/write head 272 glides over the disc surface 254 for reading and writing data on the disc surface 254. The read/write head 272 is positioned by a suspension 274. When the stabilization system 250 is subjected to a mechanical shock or vibration, the disc 252 can deflect, causing the spacing between the read/write head 272 and the disc 252 to change, resulting in a head crash or loss of data. The amplitude and duration of the deflection due to mechanical shock is limited by wing feature 262, 263, 265, 269 to reduce head crashes and loss of data.

The wing feature 262 includes an aerodynamic surface 264 that faces the disc surface 254. The aerodynamic surface 264 has an interaction with the gas layer 258 that generates an aerodynamic force 266 on the disc surface 254. The wings features 263, 265, 269 also have aerodynamic surfaces that interact with the corresponding gas layers 258, 260 to generate forces on the surfaces 254, 256. A strut 270 rigidly supports the wing features 262, 263 over the disc surface 254 in a position such that the resulting aerodynamic forces (such as force 266) increase as the disc surface 254 deflects toward the aerodynamic surfaces of wing features 262, 263. A strut 271 supports the wing features 265, 269 over the disc surface 256 in a position such that the resulting aerodynamic forces (such as force 267) increase as the disc surface 256 deflects toward the aerodynamic surfaces of the wing features 265, 269. The struts 270, 271 are shaped to avoid contacting the spinning disc 252 and rigidly support the multiple aerodynamic surfaces (such as surface 264). The struts 270, 271 are less deflectable by shock and vibration than the disc 252. When the disc 252 is deflected by shock or vibration, the disc 252 moves relative to the aerodynamic surfaces, changing a spacing 280 as explained below in connection with FIG. 4.

FIG. 4 illustrates a side cross-sectional view of a portion of the disc stabilization system 250 at a quiescent condition. FIG. 5 illustrates a cross-sectional view of a portion of the disc stabilization system 250 during a shock. Reference numbers used in FIGS. 4–5 that are the same as reference numbers used in FIG. 3 represent the same or similar features. As can be seen in FIG. 4, when there is no shock, the disc 252 is centered in a quiescent condition and the spinning gas layers 258, 260 can interact only very weakly with the aerodynamic surfaces 264, 281 of the wing features 262, 269. In FIG. 4, there is little power loss from drag in the quiescent position.

As can be seen in FIG. 5, when there is a shock, the disc 252 is deflected upward from its centered position (shown in broken lines) and the spinning gas layers 258 can interact strongly with the aerodynamic surfaces 264 of the wing features 262. This strong aerodynamic interaction generates a downward force on the disc 252 that tends to return the disc to its centered, quiescent position. If the downward force causes the disc to overshoot (not illustrated in FIG. 5), then the aerodynamic surface 281 can interact with the spinning gas layer 260 to generate a force in the opposite direction that again tends to center the disc 252. This centering process is described below in more detail in connection with FIG. 6.

FIG. 6 illustrates aerodynamic force on a disc as a function of displacement of the disc. Reference numbers used in FIG. 6 that are the same as reference numbers used in FIGS. 3-5 represent the same or similar features. In FIG. 6, a centerline of the disc 252 is deflected by shock or vibration along a path 282. A graph of aerodynamic forces 288, 290 generated by the disc stabilization system is illustrated. A vertical axis 286 of the graph represents a composite force from aerodynamic interactions with both aerodynamic surfaces 264, 281. A horizontal axis 284 of the graph represents deflections distance of the centerline due to shock or vibration. It can be seen from FIG. 6 that the aerodynamic forces 288, 290 are weak when the disc is centered, and increase non-linearly as the disc deflects from the centerline. The forces 288, 290 tend to return the disc to its centered position as described below in connection with FIG. 7.

FIG. 7 illustrates a timing diagram of disc motion responsive to a mechanical shock. In FIG. 7, horizontal axes 300, 302, 304 represent time. An impulse 306 represents a mechanical shock to the disc. A first waveform 308 represents deflection of a disc without the use of a disc stabilization system. A second waveform 310 represents deflection of a disc with the use of a disc stabilization system as presently disclosed. Without the use of the disc stabilization system, the deflection of the disc has a larger initial amplitude at 312 and there is a longer decay envelope 314. With the use of the disc stabilization system, the deflection of the disc has a smaller initial amplitude 316 (compared to amplitude 312) and there is a relatively shorter decay envelope 318 (compared to decay envelope 314).

In summary, a disc stabilization system (such as 150) comprises a spinning disc (such as 152) that has a disc surface (such as 156) that is deflectable by shock or vibration. The disc surface is in contact with a gas layer (such as 160) adjacent the disc surface. A read/write head (such as 172) glides over a disc surface (such as 154) for reading and writing data. The read/write head is positioned by a suspension (such as 174). When the stabilization system is subjected to shock, the disc can deflect. The amplitude and duration of the deflection due to mechanical shock is limited by a wing feature (such as 162). The wing feature includes an aerodynamic surface (such as 164) that has an interaction with the gas layer. The interaction generates an aerodynamic force (such as 166) on the disc surface (such as 156). A strut (such as 170) supports the wing feature over the disc surface in a position such that the aerodynamic force increases as the disc surface deflects toward the aerodynamic surface.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the stabilization system while maintaining substantially the same functionality without departing from the scope and spirit of the present invention. In addition, although the preferred embodiment described herein is directed to a disc drive system for data storage, it will be appreciated by those skilled in the art that the teachings of the present invention can be applied to other spinning discs, without departing from the scope of the present invention.

What is claimed is:

1. A disc stabilization system, comprising:
   a spinning disc having a disc surface that is deflectable by a shock;
   a fluid layer spinning adjacent the disc surface;
   a wing feature including an aerodynamic surface positioned proximate the fluid layer, which generates an aerodynamic force on the disc surface; and
   a strut that is substantially non-rotatable, that has at least a portion overlapping the disc surface, and that supports the wing feature over the disc surface in a position such that the aerodynamic force increases as the disc surface deflects toward the aerodynamic surface.

2. The disc stabilization system of claim 1 wherein the aerodynamic surface is supported by the strut to be less deflectable by the shock than the disc surface.

3. The disc stabilization system of claim 1 wherein the disc surface deflects in an oscillatory motion due to the shock, and the aerodynamic force damps the oscillatory motion.

4. The disc stabilization system of claim 1 wherein the spinning disc includes a second disc surface opposite the disc surface, and further comprises:
   a second fluid layer spinning adjacent the second disc surface;
   a second wing feature including a second aerodynamic surface positioned proximate the second fluid layer, which generates a second aerodynamic force on the second disc surface; and
   a second strut that is substantially non-rotatable and that supports the second wing feature over the second disc surface such that the second aerodynamic force increases as the disc surface deflects toward the second aerodynamic surface.

5. The disc stabilization system of claim 1 wherein the spinning disc includes a second disc surface opposite the disc surface, and further comprises:

a head flying over the second disc surface opposite aerodynamic surface.

6. The disc stabilization system of claim 1 wherein the disc comprises a data storage medium.

7. The disc stabilization system of claim 1 wherein the wing feature is shaped to provided a desired ground effect force on the disc surface.

8. The disc stabilization system of claim 1 wherein the aerodynamic force reduces coning of the spinning disc.

9. The disc stabilization system of claim 1 wherein the aerodynamic force is a non-linear function of a spacing between the disc surface and wing feature.

10. A method of stabilizing a spinning disc, comprising:

spinning a disc that has a disc surface that is deflectable by a shock, thereby driving a fluid layer adjacent the disc surface to spin;

providing a wing feature with an aerodynamic surface that interacts with the fluid layer to generate an aerodynamic force on the disc surface; and supporting the wing feature over the disc surface with a strut, that has at least a portion overlapping the disc surface and that is substantially non-rotable, in a position where the aerodynamic force increases as the disc surface deflects toward the aerodynamic surface.

11. The method of claim 10 further comprising:

supporting the aerodynamic surface to be less deflectable than the disc surface.

12. The method of claim 10 further comprising:

damping an oscillatory motion of the disc surface with the aerodynamic force.

13. The method of claim 10 wherein the spinning disc includes a second disc surface opposite the disc surface, and the method further comprises:

spinning a second fluid layer adjacent the second disc surface;

providing a second wing feature including a second aerodynamic surface positioned proximate the second fluid layer, which generates a second aerodynamic force on the second disc surface; and providing a second strut that is substantially non-rotatable and supporting the second wing feature over the second disc surface such that the second aerodynamic force increases as the disc surface deflects toward the second aerodynamic surface.

14. The method of claim 10 wherein the spinning disc includes a second disc surface opposite the disc surface, and the method further comprises:

flying a head over the second disc surface opposite the aerodynamic surface.

15. The method of claim 10 wherein the disc comprises a data storage medium.

16. The method of claim 10 further comprising:

shaping the wing feature to provided a desired ground effect force.

17. The method of claim 10 further comprising:

reducing coning of the spinning disc with the aerodynamic force.

18. A disc stabilization system, comprising:

a spinning disc having a disc surface that is deflectable by a shock;

a fluid layer spinning adjacent the disc surface; and means for interacting with the disc surface to provide an aerodynamic force to the disc surface that increases as the disc surface deflects toward the aerodynamic surface, the means for interacting with the disc surface being non-rotatable.

19. The disc stabilization system of claim 18 wherein the disc comprises a data storage medium.

20. The disc stabilization system of claim 18 wherein the means for interacting is shaped to provided a desired ground effect force on the disc surface.

21. The disc stabilization system of claim 18 wherein the aerodynamic force reduces coning of the spinning disc.

22. The disc stabilization system of claim 18 wherein the aerodynamic force is a non-linear function of a spacing between the disc surface and wing feature.

* * * * *